Figure 1:
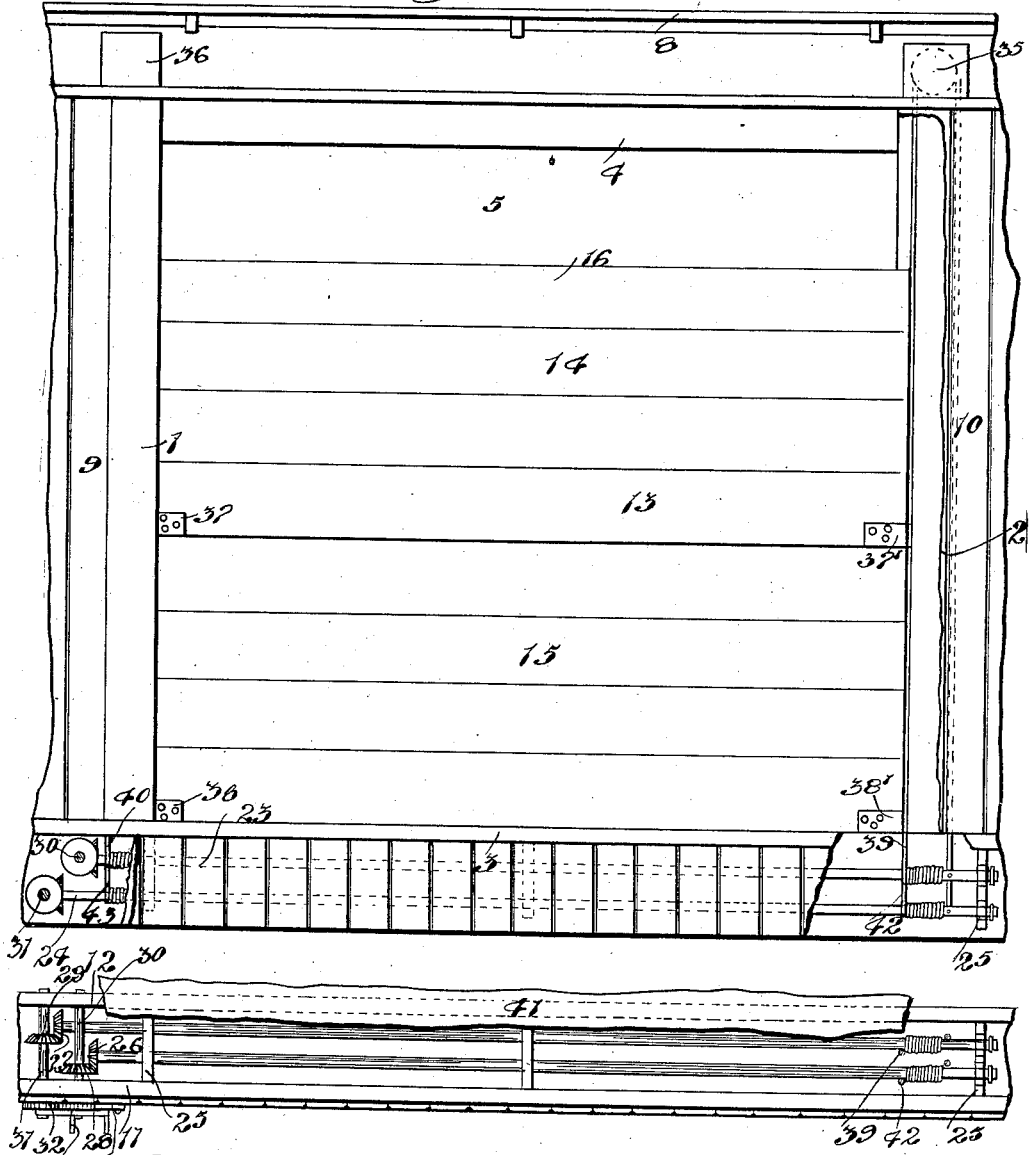

J. WOODS.
GRAIN DOOR.
APPLICATION FILED JUNE 15, 1911.
1,073,202.
Patented Sept. 16, 1913.
2 SHEETS—SHEET 2.
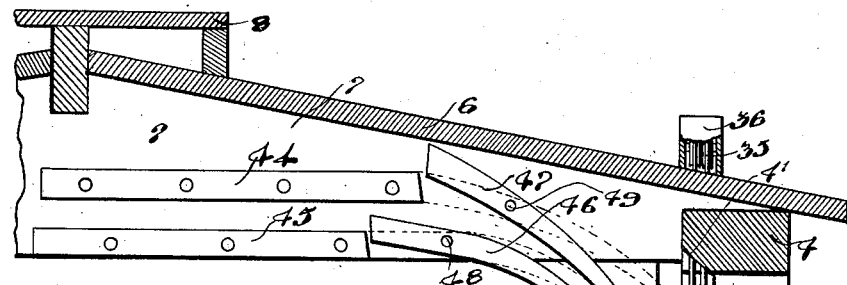
Fig. 2.
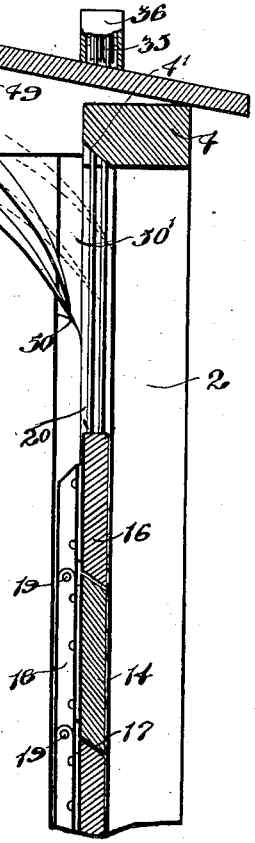
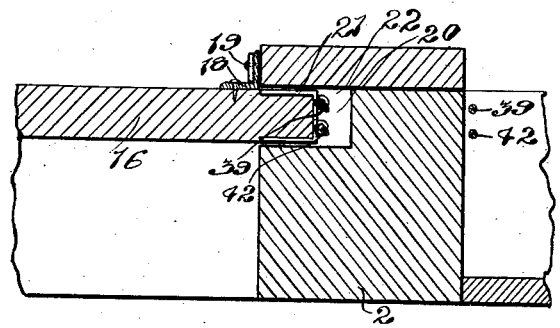
Fig. 4.
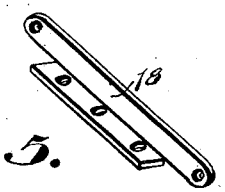
Fig. 5.
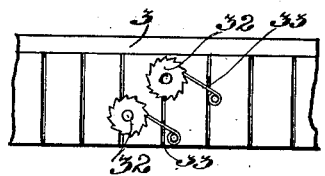
Fig. 6.
Witnesses
R. Foster
G. Thomson
Inventor
J. Woods.
By
Fred B. Falunstaugh
Atty

UNITED STATES PATENT OFFICE.

JOSEPH WOODS, OF HERBERT, SASKATCHEWAN, CANADA.

GRAIN-DOOR.

1,073,202.      Specification of Letters Patent.      Patented Sept. 16, 1913.

Application filed June 15, 1911. Serial No. 633,404.

*To all whom it may concern:*

Be it known that I, JOSEPH WOODS, of the village of Herbert, in the Province of Saskatchewan, Canada, have invented certain new and useful Improvements in Grain-Doors, of which the following is the specification.

My invention relates to grain doors, particularly for railway freight cars, and the object of the invention is to provide an inexpensive, durable and efficient grain door which can be readily placed on the car and which will allow the grain to be quickly unloaded.

A further object of the invention is to provide an improved means for raising the doors and for stacking them beneath the roof of the car.

With the above objects in view, the invention consists essentially in the arrangement and construction of parts hereinafter more particularly described and later pointed out in the appended claims.

Figure 1 is a side elevation of a portion of a car equipped with my door, parts being broken away to expose construction. Fig. 2 is an enlarged detailed vertical sectional view through the roof of the car showing the switch bars which control the door sections. Fig. 3 is a plan view of the floor beams of the car showing the shafts and bevel wheels used for raising and lowering the door. Fig. 4 is an enlarged detailed horizontal sectional view through one of the door posts. Fig. 5 is an enlarged detailed perspective view of one of the hinge members utilized for connecting the strips forming the door sections. Fig. 6 is a side elevation of the ratchets and ratchet wheels carried by the counter shafts.

In the drawings like characters of reference indicate corresponding parts in each figure.

1 and 2 represent the usual door posts, 3 the sill, and 4 the upper cross beam or lintel of a car, such parts bounding the usual doorway opening 5.

6 is the roof of a car carried by the cross beams 7, and 8 represents the running board.

9 and 10 are the face boards at either side of the doorway, and 11 and 12 are the floor beams.

13 is the car door comprising an upper section 14 and a lower section 15, such sections being formed from similar cross strips 16 of a length greater than the distance between the door posts, and having their edges beveled as at 17 so as to give a grain-tight joint. The strips of each section are secured to each other by hinge members 18 of angle iron cross section having portions permanently secured to the back of the strips and the opposite portions extending at right angles therefrom and connected together by pivot pins 19. The door posts have their inner corners rabbeted away at 20, and plates 21 are firmly fastened to the inner sides of the door and form with the rabbeted door posts vertically directed channels 22 which receive the ends of the door sections. At this point it is to be noticed that the members 18 are arranged so that their rearwardly directed portions, or those extending at right angles from the door, appear directly to the sides of the plates 21. This prevents the door from end-play and insures also a grain tight joint between the posts and the door.

23 and 24 are shafts carried by suitable bearings 25 interposed between the floor beams 11 and 12, which shafts carry bevel wheels 26 and 27, respectively, meshing with further bevel wheels 28 and 29 carried by short counter shafts 30 and 31 mounted in the beams.

32 are ratchet wheels fixed on the outer ends of the shafts, and 33 are pivoted ratchets engageable with the ratchet wheels.

34 are levers releasably secured to the shafts.

35 are loose pulleys located in housings 36 appearing on the roof of the car more or less directly above the door posts.

37, and 37′, 38, and 38′ are straps firmly riveted to the lower corners of the door section, respectively.

39 and 40 are cords or cables passing from the shaft 23 upwardly within the channels 22 through the roof and over a pair of pulleys 35 within the housings 36, whence they are turned downwardly at the opposite or outer sides of the door posts, through the car floor 41 and back to the shafts where they are secured. The cords are fastened also to the straps 37, and 37′. 42 and 43 are further cords or cables fastened to the shaft 24 and passing upwardly within the channels and through the roof over the second pair of pulleys 35 where they return downwardly at the outer side of the posts and pass through the floor to the shaft (24) where they are secured. The cords 42 and 43 are fastened permanently to the straps 36 and 38' respectively. Accordingly the door sections can be raised or lowered at will by turning the shafts with the cranks.

In order that the door sections can be stacked or housed within the roof of the car when not in use, I have provided the following parts which are carried by the roof beams: 44 and 45 are supporting beams firmly fastened to a pair of the roof beams 7 and passing across the central portion of the car. The bars are spaced apart so as to allow one of the door sections to pass between them, while the upper bar is positioned sufficiently far beneath the car roof to allow the other above its section to pass. 46 and 47 are switch bars pivotally secured by pins 48 and 49 to the aforesaid pair of beams 7 and having their lower ends tapered to an edge and resting on shoulders 50 formed in the upper ends of the plates 21 by cutting away portions 50' of the upper inner corners of the plates.

Assuming the switch bars in the position shown in Fig. 2 of the drawings, and that the upper section of the door is raised by the turning of the shaft 23 in a proper direction, the door section will pass upwardly within the channels until its upper edge engages the angularly disposed face 4' of the lintel by which it is swung inwardly and falls on the upper switch bar 47. As the cords continue to draw the lower edge of the door section upwardly the advancing edge thereof passes between the roof of the car and the supporting bars 44 and when it comes to its final position the lower end of the switch bar is swung upwardly to the dotted position (see Fig. 2). This operation will be readily understood when one remembers that the weight of the advancing end of the door is carried by the upper ends of the switch bars at a time when the lower end is held free of the lower ends of the switch bars by the cables. When the second section of the door is raised by turning the shaft 24 its advancing edge is deflected by the switch bars 47 on to the switch bars 46, which bars take the position shown in Fig. 2 when the section is wholly up. It is pointed out that the door sections are released from the channels by passing through the openings 50' formed by cutting away portions of the upper ends of the plates 21 when forming the shoulders 50.

What I claim as my invention is:

1. The combination with the door posts, lintel, floor and roof beams, and roof of a car, said door posts being provided with vertically directed channels, of flexible door sections passing between the posts and having their ends received within the channels, means connected to the lower edges of the door sections for raising and lowering the same, pairs of switch bars pivotally secured to the roof beams and adapted to pass the sections, the one beneath the other, when raised, and direct them beneath the car roof, and supporting bars secured to the roof beams for receiving the doors after they are passed over the switch bars, as and for the purpose specified.

2. The combination with the posts, lintel, floor and roof beams, and roof of a car, said door posts being rabbeted away at their inner corners, and said lintel presenting in angularly disposed face, of plates secured permanently to the inner sides of the posts and forming with rabbeted away portions thereof, vertically directed channels, said plates having portions of their upper ends cut away to form shoulders and allowing of escape from the channels, independent flexible door sections passing between the posts and operating within the channels, independent raising means secured to the lower corners of the door sections, pairs of switch bars pivotally secured to the roof beams, and located one above the other, said switch bars having their lower ends resting normally on the aforesaid shoulders and more or less continuous with the inner faces of the plates, and supporting bars secured to the roof beams and passing across the central portion of the car, said roof beams being located one above the other and adapted to receive and support the door sections passed over the switch bars, as and for the purpose specified.

3. The combination with the door-post, roof and floor beams, of a car, said door-post having the inner corners rabbeted away, of plates permanently secured to the inner faces of the door-posts forming with the rabbeted away portions thereof vertical channels, said plates having their upper ends partially cut away to allow of an escape from the channels and to form shoulders, flexible door sections carried by the door-posts and operating within the channels, a pair of rotatably mounted parallel shafts carried by the floor beams, means for rotating the shafts, pairs of loose pulleys located on the roof of the car and alined with the channels, pairs of cables passing around the pairs of pulleys, one pair of cables having the ends thereof connected to one of the shafts and oppositely wound thereon and the other pair of cables having the ends thereof connected to the other of the shafts and oppositely wound thereon, both of said pairs of cables passing within the channels, means connecting one pair of the cables with one of the door sections, means connecting the other pair of cables with the other of the door sections, means for deflecting the respective door sections beneath the roof of the car when raised there being a distinct deflecting means for each section and means for receiving the doors after deflection and for supporting them beneath the roof of the car, as and for the purpose specified.

Signed at Herbert, in the Province of Saskatchewan, this 3rd day of May, 1911.

JOSEPH WOODS.

In the presence of—
 I. S. WIENS,
 P. J. SCOLES.

Copies of this patent may be obtained for five cents each, by addressing the "Commissioner of Patents, Washington, D. C."